United States Patent Office.

HENRY A. ALDEN, OF MATTEAWAN, NEW YORK, ASSIGNOR TO NEW YORK RUBBER COMPANY.

*Letters Patent No. 72,772, dated December 31, 1867.*

IMPROVED COVERING FOR FOOT-BALLS.

The Schedule referred to in these Letters Patent and making part of the same.

TO WHOM IT MAY CONCERN:

Be it known that I, HENRY A. ALDEN, of Matteawan, in the county of Dutchess, and State of New York, have invented certain new and useful Improvements in Covering for Foot-Balls, &c.; and I hereby declare the following to be a full, clear, and exact description of the same.

The object of my invention is to provide a durable and inexpensive covering for foot-balls, and one possessing at the same time great advantages over any of the ordinary coverings now in use. Such balls are usually composed of a bladder capable of being inflated or distended by air, and provided with a covering of leather or other like material. This leather cover, besides being very liable, from the nature of its construction, to crack or break at the seams, is easily affected by wet or moisture; in fact, after being wet it is unfitted for further use unless carefully dried and oiled.

In order to obviate these and other disadvantages which attend the use of such covers, I form the covering of the ball of vulcanized rubber, moulded, in the manner well known to those skilled in the art, to the form and size required for the foot-ball. This spherical rubber case may be made simply of ordinary vulcanized rubber or of the rubber combined with or spread upon a canvas or cloth backing, and has cut in it a suitable slit or opening through which the bladder can be inserted and placed within the case. After this has been done, the bladder may be inflated in the usual manner, and the slit or opening in the outer rubber casing closed or laced up by means of a string passing through a series of holes formed in the case on opposite sides of the opening, in a manner similar to that employed in lacing shoes or boots, or the slit may be closed by other suitable means.

The rubber covering, whether backed by cloth or not, is of great durability, can be made more readily and at less expense than a leather cover, and possesses the important advantage of being impervious to wet or moisture, which cannot in any way injuriously affect it.

In connection with this rubber covering, I prefer to substitute for the bladder, which is usually employed, an inner ball or bag of thin vulcanized rubber, provided with a flexible tube, through which the air may be blown into or discharged from the ball. This tube may be combined with the ball, as described and shown in Letters Patent recently granted me, or in any other suitable manner. After the ball has been properly distended by inflation, the tube is tied or otherwise stopped, so as to prevent the escape of the air in the ball, and the rubber cover is laced up, as before described. This inner ball or bag of rubber is much more durable than the bladder, and is besides less affected by the wet or moisture, which may, at times, reach the interior of the cover, and a foot-ball formed of two balls or cases thus made and combined is much superior in many and important respects to others heretofore in use.

Having described my invention, and the manner in which the same is or may be carried into effect, what I claim, and desire to secure by Letters Patent, is—

1. A foot-ball composed of a bladder, or its equivalent, capable of being distended by inflation, provided with a separate covering or casing of vulcanized rubber, whether combined or not with a cloth backing, substantially as and for the purposes set forth.

2. A foot-ball formed of a hollow rubber ball, provided with a suitable inflating-apparatus, and covered by an outer casing of vulcanized rubber, with or without a cloth backing, substantially as and for the purposes herein described.

In testimony whereof, I have signed my name to this specification before two subscribing witnesses.

H. A. ALDEN.

Witnesses:
 W. N. RICHARDS,
 THOMAS ALDRIDGE, Jr.